United States Patent [19]

Schreiner et al.

[11] 4,080,128

[45] Mar. 21, 1978

[54] APPARATUS FOR THE PRODUCTION OF COMPACTS OF LAYERWISE DIFFERENT COMPOSITION, FOR HEAVY DUTY ELECTRIC CONTACTS

[75] Inventors: Horst Schreiner; Bernard Rothkegel, both of Nuremberg, Germany

[73] Assignee: Siemens Aktiengesellschaft, Munich, Germany

[21] Appl. No.: 759,243

[22] Filed: Jan. 13, 1977

Related U.S. Application Data

[63] Continuation of Ser. No. 568,860, Apr. 17, 1975, abandoned.

[30] Foreign Application Priority Data

Apr. 29, 1974 Germany ............................ 2420726

[51] Int. Cl.[2] ........................ B30B 11/10; B29C 3/00; B30C 11/06

[52] U.S. Cl. ....................................... 425/78; 425/353; 425/345; 425/355

[58] Field of Search ................. 425/78, 245, 352, 353, 425/345, 355

[56] References Cited

U.S. PATENT DOCUMENTS

| | | | |
|---|---|---|---|
| 1,991,706 | 2/1935 | Seabury | 425/345 |
| 2,449,008 | 9/1948 | Pecker et al. | 425/78 |
| 2,700,938 | 2/1955 | Wolff et al. | 425/345 X |
| 2,944,493 | 7/1960 | Bailey et al. | 425/78 |
| 3,276,079 | 10/1966 | Cohn | 425/345 |
| 3,337,915 | 8/1967 | Alexander | 425/345 X |
| 3,388,427 | 6/1968 | Smallbone | 425/345 |
| 3,645,658 | 2/1972 | DeTroyer | 425/78 |
| 3,677,673 | 7/1972 | Shapiro | 425/78 |
| 3,729,281 | 4/1973 | Okubo et al. | 425/355 X |
| 3,733,154 | 5/1973 | Smith et al. | 425/345 X |
| 3,876,352 | 4/1975 | DeTroyer et al. | 425/78 |

*Primary Examiner*—J. Howard Flint, Jr.
*Attorney, Agent, or Firm*—Kenyon & Kenyon, Reilly, Carr & Chapin

[57] ABSTRACT

An apparatus for producing compacts having layers of different composition. More particularly, each metal powder layer is charged in a separate work station and each is pressed in a separate work station with an individual constant pressing pressure. This is achieved by moving a number of pressing tools corresponding to the number of work stations intermittently from station to station by cyclic interchange. After each movement, charging, pressing and ejecting occur simultaneously at the respective work stations.

3 Claims, 6 Drawing Figures

APPARATUS FOR THE PRODUCTION OF COMPACTS OF LAYERWISE DIFFERENT COMPOSITION, FOR HEAVY DUTY ELECTRIC CONTACTS

This is a continuation, of application Ser. No. 568,860, filed Apr. 17, 1975, now abandoned.

BACKGROUND OF THE INVENTION

1. Field of the Invention

The present invention concerns an apparatus for the producing compacts having layers of different composition and, in particular, to an apparatus where each of the different metal powder layers of a compact is charged in a pressing tool and pressed before the following metal powder layer is charged.

2. Description of the Prior Art

A method for making compacts is disclosed in German Pat. Application No. 1,458,477. In this method multi-layer compacts, which are used for making heavy duty electric contacts, are pressed layer by layer, then sintered and impregnated with a metal of high electric conductivity. To give the layered sinter skeleton a different degree of packing, the individual superposed layers of the compact are compressed with different pressing pressures.

The aforesaid production of the multi-layer compacts is usually carried out by employing a pressing tool which is fixed on a press table and which includes a punch, die and die-plate. Between the individual strokes of the pressing tool, charging devices are moved over the die-plate, charging the respective metal powder layers. With this technique it is unavoidable that scattered powder lying on the press table from previous chargings will get into the subsequent metal powder layers to be charged. This results in an undesired mixing of the different metal powder layers. Additionally, since succeeding strokes of press follow rapidly, the press cannot be readily adjusted to provide different constant pressing pressures for different powder layers.

In the aforesaid prior art method, moreover, mechanical presses must necessarily be employed, since hydraulic units can only be adjusted to certain pressing pressures which lie between the minimum pressure and the maximum pressure of the respective hydraulic unit. In using such mechanical presses, the stroke is adjusted so that the individual metal powder layers are compacted to a certain height. When pressing to constant height, however, a constant pressing pressure is not maintained, and, due to the tolerances in the charging of the metal powder layers, this results in density variations in the individual layers of the compacts. With the occurrence of these density fluctuations, the conditions for the subsequent sintering and impregnating of the compacts can no longer be fixed optimally. Moreover, the density fluctuations have an effect on the degree of packing of the impregnating metal, so that the electric contacts produced with the compacts show quality fluctuations with regard to their resistance to burning and their electric conductivity.

It is also known that tablets having two or more layers can be made by moving each of a plurality of pressing tools past work stations located on a circular path and at which charging of the different composition occurs. Between these work stations the punches of the pressing tools are pushed down over a punch cam until the previously charged respective layers have been compressed to a certain height. Since constant density of the layers of the different tablets is not important, the aforesaid known technique is not applicable to the making of the above-described compacts for heavy duty electric contacts. Moreover, since in the tablet making procedure, the pressing tools are moved continuously, one cannot realize constant pressing pressures through the technique of pressing to a constant height.

The primary object of the present invention is to provide an apparatus for producing compacts having layers of different composition in which the individual layers are neatly separated and not intermixed and in which no density fluctuations occur in the individual layers of different compacts.

SUMMARY OF THE INVENTION

The above and other objects are realized in accordance with the present invention in an apparatus in which each metal powder layer of a compact is charged in a separate work station and, additionally, is pressed in a separate work station with an individual constant pressing pressure. In particular, a number of pressing tools corresponding to the number of work stations are moved, respectively, intermittently from station to station by cyclic interchange. Specifically, tools moved from a charging station are moved to a pressing station, while tools moved from a pressing station are moved to a charging station. After a given movement of the tools, simultaneous charging and pressing at the respective stations occurs.

Due to the aforesaid separation in space of the charging stations and of the pressing stations, powder scattered during the former operations can be removed after each operation and, hence, a neat separation of the metal powder layers is realized. Such separation also permits a particular work station to have its pressing pressure set for the optimum density of the particular metal powder layer being pressed at the station. Moreover, due to the simultaneous occurrence of all charging and pressing operations, the cycle time is shortened from the sum of all operational steps to the time of the longest operational step plus the time required for the intermittent advance of the pressing tools and the ejection of the finished compact. The aforementioned setting of the individual pressing pressures also enables the depth of penetration of the individual metal powder layers to be accurately controlled. Also a uniform charging and, hence, narrow tolerance in the plane-parallelity of the individual layers of the compact is realized, due to the use of separate charging stations.

Preferably, the finished compacts are ejected from the pressing tools in a separate work station, charging or pressing or ejecting taking place simultaneously in all work stations. By this measure the cycle period is further shortened by the time required for the ejection of the finished compact.

Apparatus for producing the compacts in accordance with the invention includes a rotatable turntable which is intermittently rotated about a vertical axis of rotation. Additionally, the apparatus is provided with pressing tools which are arranged on the turntable in uniform division. Associated with the pressing tools are stationary devices for the charging and pressing of the different metal powder layers. Also, another stationary device may be provided for ejecting the finished compacts. With the aforesaid arrangement of the individual devices for the charging pressing and ejecting, an apparatus is realized having an extremely space-saving construction. Moreover, due to the fact that not only the die-plates but also the respective punches and dies of the pressing tools are moved, slight errors of division, which cannot be avoided with an intermittent drive of the turntable, are not disturbing.

Preferably, pneumatically or hydraulically operated devices are provided for the charging and pressing of the different metal powder layers and for the ejecting of the finished compact. Thus, the likelihood of trouble from these devices is greatly minimized. Moreover, with such devices pressing the individual metal powder layers at constant pressing pressures is readily realized.

Advantageously, fixed suction devices for the removal of scattered powder are provided between the devices for the charging and the devices for the pressing of the different metal powder layers. The loss of the individual metal powders can thus be kept extremely low by re-using the sucked-off scattered powder.

BRIEF DESCRIPTION OF THE DRAWINGS

An embodiment of the invention will be explained more fully in the following detailed description which makes reference to the accompanying drawings, which.

DETAILED DESCRIPTION

Figure 1:
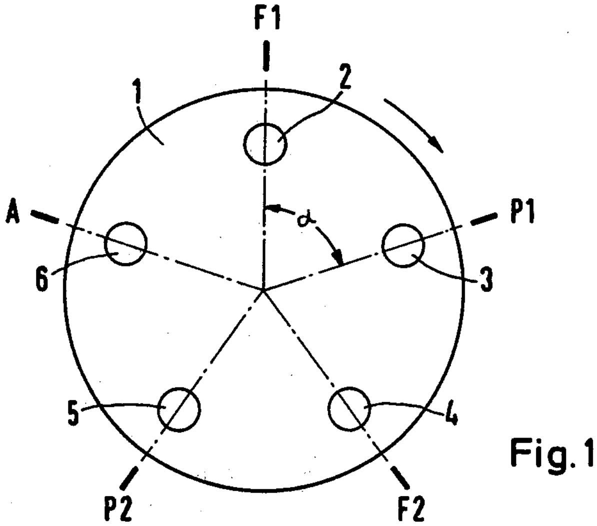
FIG. 1 shows apparatus for making compacts in accordance with the principles of the present invention.

FIG. 1 shows diagramatically a turntable 1, on which pressing tools 2 to 6 are uniformly arranged so they are spaced from each other at sector angles alpha = 72°. The pressing tools 2 to 6 are associated with work stations F1, P1, F2, P2 and A, the individual work stations corresponding to the process steps listed below:

F1: Charging of a first metal powder layer;

P1: Pressing of the first metal powder layer;

F2: Charging of a second metal powder layer over the first compacted metal powder layer;

P2: Pressing of the second metal powder layer and possibly recompacting of the first metal powder layer; and A: Ejecting of the finished compact.

Figure 2:
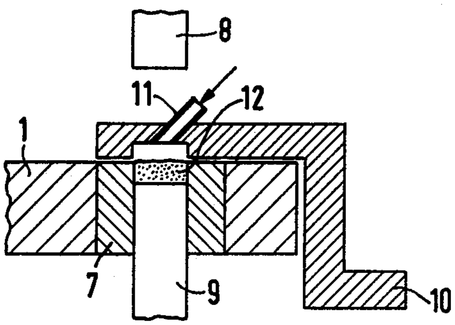
FIGS. 2 to 6 show sectional views of the pressing tool of the apparatus of FIG. 1 in the various work stations of the apparatus.

FIG. 2 shows the charging of a first metal powder layer in charging work station F1 of FIG. 1. As shown, the pressing tool 2 located at the station F1 comprises a die-plate 7, a punch 8, and a die 9. Guides firmly connected to the turntable 1 for holding the punch 8 and die 9 are not shown in the drawing. Between the punch 8 and the turntable 1 is a fixed charging device 10 arranged at station F1. Through the filling tube 11 of this device a first metal powder layer 12 is charged into the die-plate 7.

Figure 3:
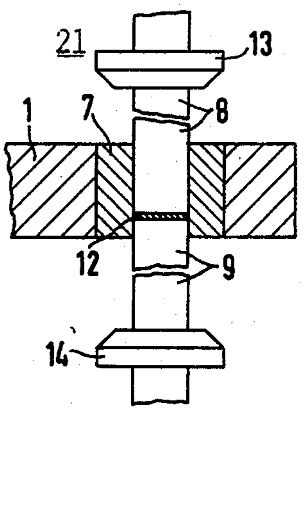

FIG. 3 shows the pressing of the first metal powder layer 12 by means of the pressing device 21 located at the work station P1 of FIG. 1. After the first metal powder layer 12 has been charged, and after a rotation of the turntable 1 through an angle of 72°, the pressing tool 2 is located under hydraulic pressing cylinder 13 of pressing device 21. The hydraulic pressing cylinder 13 compresses the metal powder 12 by pressing against punch 8 with a constant pressure, while die 9 rests on a die support 14 of the pressing device.

Figure 4:
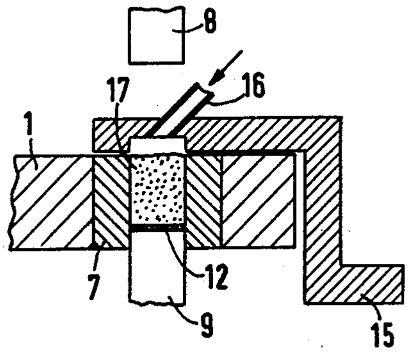

FIG. 4 shows the charging of a second metal powder layer 17 in the charging work station F2 of FIG. 1. After the first metal powder layer 12 has been pressed, and after a further rotation of the turntable 1 through an angle of 72°, the die-plate 7 is located under a charging device 15 located at station F2. Through a filling tube 16 of device 15 a second metal powder layer 17 is thus charged into the die-plate 7.

Figure 5:
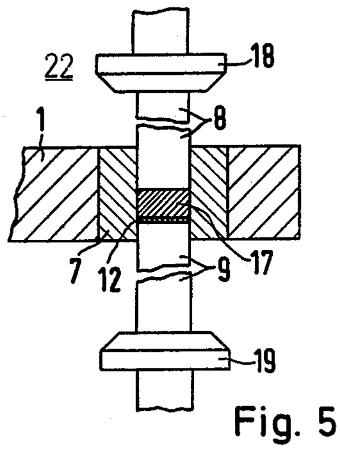

FIG. 5 shows the pressing of the second metal powder layer 17 by means of the pressing device 22 located at work station P2 of FIG. 1. After the charging of the second metal powder layer 17, and a further rotation of the turntable 1 through an angle of 72°, the tool 2 and, thus, metal powder layer 17 are moved under hydraulic pressing cylinder 18 of device 22. The hydraulic pressing cylinder 18 compresses the latter powder by pressing with a constant pressure against punch 8, while die 9 rests on a die support 19 of device 21.

Figure 6:
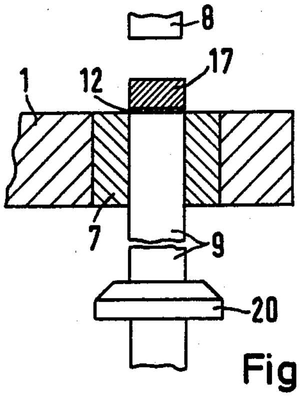

FIG. 6 shows the ejection of the finished compact by means of the device 23 in work station A of FIG. 1. After the pressing of the metal powder layer 17 and a further rotation of the turntable 1 through an angle of 72°, die 9 rests on die support 20 of device 23. Support 20 raises die 9 to the extent that the finished compact is pushed out of the die-plate 7.

As shown in FIGS. 2, 4 and 6 in the work stations F1, F2 and A, a certain minimum distance must exist between punch 8 and die-plate 7. On the other hand, before the actuation of the hydraulic pressing cylinders 13 and 18 this distance in the work stations P1 (FIG. 3) and P2 (FIG. 5) should be as small as possible, so that the pressure wave of the descending punch 8 will not blow the uncompressed metal powder layers 12 and 17 out of the die-plate 7. Therefore, the punch 8 is guided in a stationary cam rail in such a way that in the work stations F1 and F2 it assumes an upper position and in the work stations P1 and P2 a lower position. Appropriate recesses in the cam rail permit, in the work stations P1 and P2, a further lowering of the punch 8 during actuation of the hydraulic pressing cylinders 13 and 18.

I claim:

1. Apparatus for making compacts which are to be used in heavy duty electric contacts and which are a type comprising layers of different composition, each of which layers being of a constant and optimal thickness, said apparatus comprising:

- a turntable intermittently rotatable about a vertical axis;
- a number of pressing tools uniformly distributed around the turntable;
- a plurality of work stations uniformly distributed relative to said turntable in a similar distribution as said tools, said plurality of work stations being comprised of a plurality of charging stations and a plurality of pressing stations, each of said charging stations comprising one of hydraulic and pneumatic means for charging a metal powder into pressing tools arriving at that station, the metal powder being charged at each said charging station being different than the metal powder charged at the other charging stations, each of said pressing stations being disposed adjacent a corresponding charging station and including one of hydraulic and pneumatic means for causing the pressing tools arriving at that pressing station to press the metal powder charged into said tools at the charging station corresponding to that pressing station with a constant pressure which is determined by the metal powder being pressed and which is such as to result in a uniform density thereof;

and means for intermittently rotating said turntable about said axis to move each particular pressing tool intermittently and in sequence through said work stations such that after passage through all said work stations said particular pressing tool contains a plurality of layers of compressed metal powder, each of which layers of compressed metal powder having been charged at a different charging station and compressed at the pressing station corresponding to that different charging station.

2. Apparatus in accordance with claim 1 which further includes one of hydraulic and pneumatic an additional station arranged at the end of said plurality of work stations, said additional station including one of hydraulic and pneumatic means for ejecting the composite pressed powder layers held by the pressing tools arriving at said additional station.

3. Apparatus in accordance with claim 1 which further includes:

a number of stationary suction devices, each of said suction devices being arranged between one of said first charging stations and the pressing station adjacent said one station for removing scattered metal powder charged at said one station.

* * * * *